Patented Jan. 15, 1929.

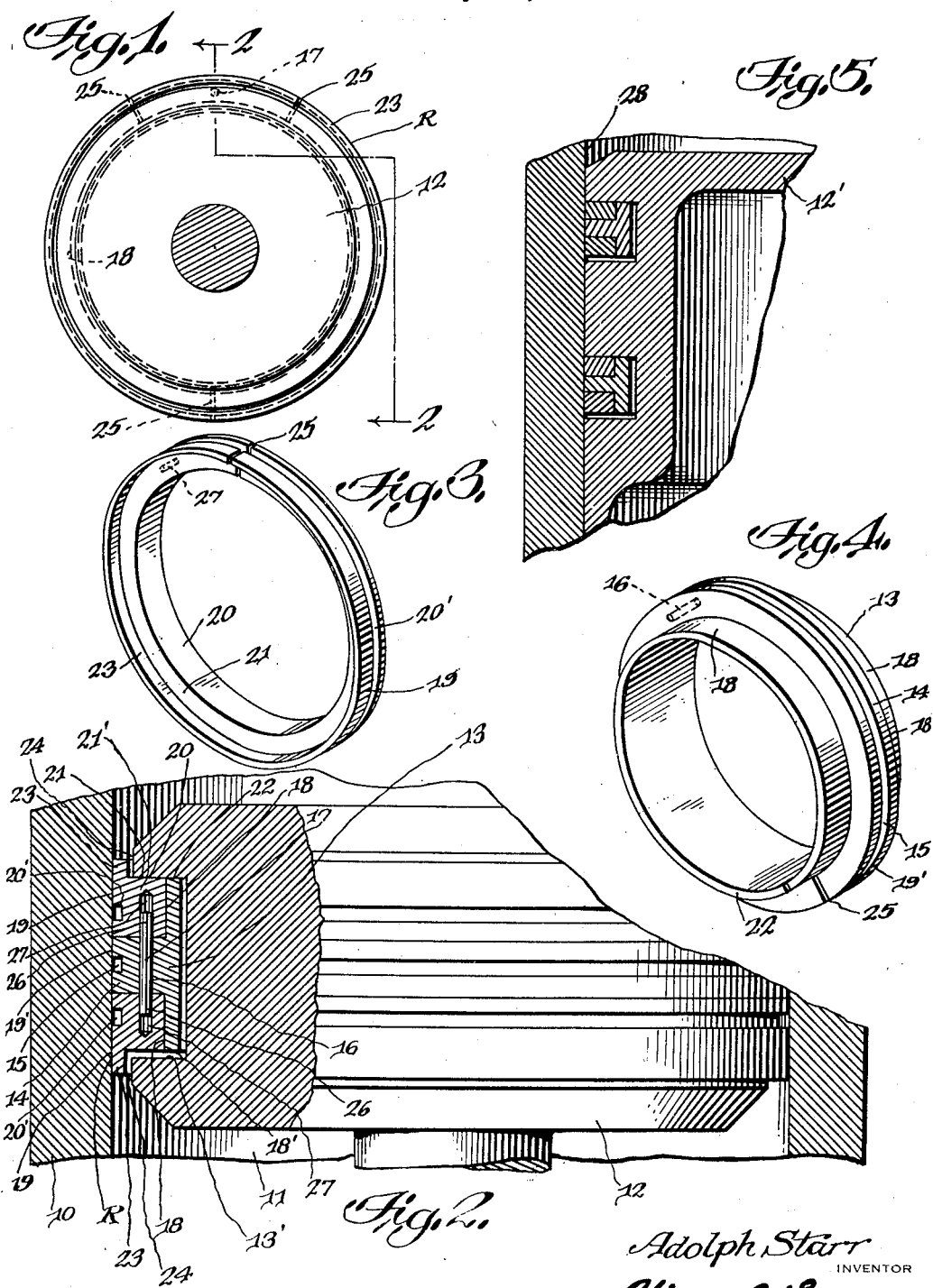

1,699,454

UNITED STATES PATENT OFFICE.

ADOLPH STARR, OF CALUMET CITY, ILLINOIS.

PISTON RING.

Application filed September 10, 1926. Serial No. 134,723.

This invention relates to certain novel improvements in piston rings and has for its principal object the provision of an improved construction of this character which will be simple in structure and highly efficient in use and effectually operable to prevent leakage between the wall of the cylinder and the piston with which the ring is associated.

Among the salient objects of the invention is the provision of a piston ring which comprises separable sections cooperating together to perform a unitary function and which is brought into contact with the wall of the cylinder at all times during the various strokes of the piston and also when the piston is at rest.

A further object of the invention is the provision of a piston ring which is adapted to be confined in an annular groove formed in the piston and which is of such width as to permit automatic shifting into engagement with the horizontal walls of the groove during the operative strokes of the piston thereby providing an effective seal preventing leakage during operation of the piston.

Other objects will appear hereinafter.

The invention consists in the combination and arrangement of parts to be hereinafter described and claimed.

The invention will be best understood by reference to the accompanying drawing illustrating the preferred form of my invention, and in which:

Fig. 1 is a plan view of a piston illustrating my invention associated therewith.

Fig. 2 is a fragmentary sectional detail view taken substantially on line 2—2 of Fig. 1.

Fig. 3 is a perspective view of one of the sections of the piston ring embodying the invention.

Fig. 4 is a perspective view of an intermediate section of the piston ring embodying the invention.

Fig. 5 is a fragmentary sectional detail view of a piston and cylinder wall illustrating a modified form of construction of a piston ring associated therewith.

Piston rings with which I am familiar prior to my invention are constructed so as to tightly fit in the grooves of the piston and in fitting the piston rings it is necessary to force the piston rings into the grooves to obtain the required fit to prevent leakage. This causes burrs to be formed on the piston which score the cylinder wall and some of these burrs create pockets in the groove which permit oil and compression leakage past the ring.

It is, therefore, one of the many objects of the invention to provide a piston ring which will not tend to score or otherwise deface the walls of the cylinder and at the same time provide an effectual seal and one which can be expeditiously assembled and manufactured at an economical cost.

In the drawing, Fig. 2, 10 indicates the wall of a cylinder 11 within which a piston 12 is operable. On the piston 12 an annular groove 13' is provided within which my improved piston ring is confined.

My improved piston ring, as illustrated in Figs. 1 to 4 inclusive, includes an intermediate ring section 13 of the split type. This ring section 13 is substantially T-shaped in cross section and embodies a lateral bearing projection 14 and formed in this bearing projection is an oil groove 15 for purposes well understood by those skilled in the art.

This ring section 13 which constitutes the intermediate section of the piston ring R embodying my invention embodies in the bearing projection a transverse opening 16 for the reception of a tie pin 17. By forming the intermediate ring section 13 substantially T-shaped in cross section there is provided opposite annular seats 18 for the reception of the outer ring sections of my improved piston ring. The width of the ring section 13 is preferably approximately ten-thousandths to twenty-thousandths of an inch less than the width of the annular groove 13' for reasons hereinafter set forth.

The outer ring sections are likewise of the split type and have outer cylindrical faces 19 disposed flush with the outer cylindrical face 19' of the bearing projection 14 and each of these outer ring sections have their main body portions 20 confined in the seats 18 with their outer edges 21 in alignment with the top edges of the ring section 13.

The outer ring sections each include an annular lateral projection 23 which is disposed between the adjacent wall 24 of the piston 12 and the wall of the cylinder 11. These projections 23 are spaced from the wall 24 of the piston 12 to permit the admission of oil into the groove 13'.

When the ring sections comprising my improved piston ring are operatively assembled together, the slits 25 are adapted to be in staggered relation that is, out of alignment. In order to retain this positioning the outer sections are secured to the middle section by the pin 16 which projects into openings 27 formed in the outer ring sections as best illustrated in Fig. 2 and projects through an opening provided in the inner ring.

In Fig. 2 of the drawing I have illustrated the piston in a position about to start an upstroke movement. When this piston moves in this direction there will be a slight advanced movement of the piston before the piston ring R will move with the piston. At the completion of this slight advanced movement the edge portion 18' of the piston ring will be brought into engaging position with the adjacent horizontal wall of the groove 13'. Since oil will be present on the cylinder and piston walls, a small quantity will collect on the horizontal wall of the piston ring groove. This will clog the small recesses, caused by unevenness in grinding and other analogous mechanical inaccuracies, on the walls of said groove and therefore an effective seal will be provided when the piston ring engages these walls when the relative movement, just described, takes place. The piston ring in this position will be disposed with its top edge 21' in spaced relation with respect to the adjacent horizontal wall of the groove 13' thus permitting the oil to find entrance to the rear of the piston ring within the groove 13'.

As I have herein indicated the width of the piston ring is slightly less than the distance between the inner wall surface of the cylinder 11 and the vertical wall of the groove 13' and this will permit expansion or contraction of the piston ring due to the change of temperature.

At this time it is pointed out that the pin 17 is loosely operatively associated with the ring sections so as to avoid binding or other distortions which would be detrimental to the operation of the ring sections.

When the piston starts its downstroke the piston ring will be shifted in an opposite direction in the groove to provide an effective seal during this downward movement of the piston.

In Fig. 2 it will be noted that the outer ring sections are likewise provided with the oil grooves 20 for reasons well understood by those skilled in the art.

In Fig. 5 I have illustrated a slightly modified form of construction and in this modified form of construction it will be noted that the cylindrical walls of the piston 12' are disposed in close proximity with the inner cylindrical wall of the cylinder 28 and in order to associate my improved piston ring with this type of piston I eliminate the annular projections 23, otherwise the piston ring is constructed in accordance with the description herein outlined and the operation of the same is substantially similar.

It is pointed out that the piston ring may be made of any suitable material and may be operatively associated to any style piston intended to eliminate any leakage of gases or liquids. The piston ring may be used in any style mechanism having a reciprocable piston operating in a cylinder, such for example a water pump, an internal combustion engine or an air compressor.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claim.

Having thus described my invention, what I claim as new and desire to protect by Letters Patent is:

In combination, a cylinder, a piston reciprocal in said cylinder and of less diameter than the bore thereof, said piston having a circumferential groove formed therein, a substantially T-shaped split ring having the head thereof disposed in said groove in spaced relation to the transverse wall thereof, said head being of less width than said groove, substantially L-shaped split rings having the stem portions thereof disposed on the stem portion of said T-shaped ring, the base portions of said L-shaped rings extending along the walls of said pistons beyond said groove and in spaced relation to said wall, all of said split rings embodying inherent resiliency adapted to cause said rings to frictionally engage the wall of said cylinder.

In testimony whereof I affix my signature.

ADOLPH STARR.